US012669010B2

(12) United States Patent
Lee

(10) Patent No.: US 12,669,010 B2
(45) Date of Patent: Jun. 30, 2026

(54) FLEXIBLE SEAL FOR A SECTION JOINT OF A MOVABLE BARRIER

(71) Applicant: OVERHEAD DOOR CORPORATION, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 18/756,957

(22) Filed: Jun. 27, 2024

(65) Prior Publication Data

US 2026/0002406 A1 Jan. 1, 2026

(51) Int. Cl.
*E06B 7/23* (2006.01)

(52) U.S. Cl.
CPC .................................. *E06B 7/2303* (2013.01)

(58) Field of Classification Search
CPC .... E06B 7/2303; E06B 7/2309; E06B 7/2312; E06B 3/485; B60J 10/24; E05D 15/24; E05D 15/242; E05D 15/26; E05D 15/262
See application file for complete search history.

(56) References Cited

U.S. PATENT DOCUMENTS 4,381,115 A * 4/1983 Ko .......................... B60J 10/24 277/921
5,581,951 A * 12/1996 Ryan .................... E06B 7/2309 49/489.1
8,112,940 B2 * 2/2012 Mayer .................. E06B 7/2309 160/40
10,654,349 B2 * 5/2020 Matsuura ............. E06B 7/2312
11,851,930 B2 12/2023 Lee
12,071,809 B2 * 8/2024 Lee ..................... E06B 9/17076

OTHER PUBLICATIONS

Image of a conventional seal prior to Jun. 27, 2024, 1 page.

* cited by examiner

*Primary Examiner* — Muhammad Ijaz
*Assistant Examiner* — Susan M. Heschel
(74) *Attorney, Agent, or Firm* — Haynes and Boone, LLP

(57) ABSTRACT

A flexible seal for sealing a gap between adjacent frames of a movable barrier may include a first end, a second end, and a central region extending between the first end and the second end. The first end may include a sealable surface and the second end may include a retaining surface. The central region may include a neck, legs, and a cavity. The neck may be narrower than the ends. The legs may each include an inwardly facing surface and an outwardly facing surface. The cavity may be positioned between the first end and the second end. When the flexible seal is compressed, the sealable surface may press against an adjacent frame. Further, the retaining surface and the outwardly facing surfaces may press against another adjacent frame. Further, the inwardly facing surfaces may compress the cavity such that a distance between the inwardly facing surfaces decreases.

20 Claims, 8 Drawing Sheets

FLEXIBLE SEAL FOR A SECTION JOINT OF A MOVABLE BARRIER

TECHNICAL FIELD

The present disclosure relates generally to seals, and more particularly, sectional seals that may be usable to seal between adjacent components, such as sectional door systems and other movable barriers.

BACKGROUND

Movable barriers, such as garage doors, generally include seals to prevent external environmental conditions, such as sound, water, air, thermal transmission (also known as SWAT conditions), from transferring from the exterior of the movable barrier to the interior. Section joints of movable barriers generally require flexible seals which may compress and form a tight seal when the section joint is closed. Standard flexible seals may typically have a short lifespan as the seal may not be configured to undergo the continuous wear and tear of repeated movement. Further, the seal may not be configured to resist crushing and resist taking a permanent compression set when the section joint is closed. Thus, there remains a need for effective ways to seal a section joint of a movable barrier.

SUMMARY

Embodiments of the present disclosure include systems, devices, and methods of sealing a section joint of a movable barrier.

In some examples, a flexible seal for sealing a gap between two adjacent frames of a movable barrier may include a first end comprising a sealable surface configured to selectively sealably press against one of the two adjacent frames. The flexible seal may further include a second end comprising a retaining surface configured to press against the other of the two adjacent frames. The flexible seal may further include a central region extending between the first end and the second end, the central region comprising a neck, a first leg, a second leg, and a cavity, the neck being more narrow than the first end and the second end, the first leg and the second leg each comprising an inwardly facing surface and an outwardly facing surface, the first leg and the second leg being compressible into the cavity in a manner that a distance between the inwardly facing surfaces changes when the two adjacent frames are brought together.

In some examples, a movable barrier system for sealing a gap between adjacent frames may include a first frame comprising a slot having an opening, the slot comprising a slot surface extending from the slot opening. The movable barrier system may further include a second frame comprising a compressing surface. The movable barrier system may further include a flexible seal which may include an outer surface including a scalable surface configured to selectively press against the compressing surface of the second frame, and a retaining surface configured to be retained within the slot of the first frame and extend out of the slot when in an uncompressed condition. The flexible seal may further include a first leg and a second leg each extending between the scalable surface and the retaining surface, the first leg being substantially opposite the second leg and cooperatively defining a neck between the scalable surface and the retaining surface. The flexible seal may further include a cavity comprising a first portion on a first side of the neck and a second portion on an opposing second side of the neck, the first leg and the second leg being configured to collapse into the cavity in a manner that a distance between the first leg and the second leg decreases when the flexible seal is compressed between the first frame and the second frame.

In some examples, a method for sealing a gap between adjacent frames of a movable barrier may include providing a flexible seal, a first frame, and a second frame. The flexible seal may include a first end comprising a scalable surface. The flexible seal may further include a second end comprising a retaining surface. The flexible seal may further include a central region disposed between the first end and the second end, the central region comprising a neck defined by a first leg and a second leg, the neck being more narrow than the first end and the second end, the first leg and the second leg each comprising an inwardly facing surface and an outwardly facing surface, the central region also comprising a cavity positioned between the first end and the second end. The method may further include positioning the flexible seal in a slot of the first frame, the slot comprising a slot opening and a slot surface extending from the slot opening. The method may further include displacing the second frame in a manner that a compressing surface of the second frame compresses the flexible seal, so that the sealable surface presses against the compressing surface and so that at least a portion of the retaining surface and at least a portion of the outwardly facing surfaces of both the first leg and the second leg press against the slot surface and a distance between the inwardly facing surfaces decreases.

Additional aspects, features, and advantages of the present disclosure will become apparent from the following detailed description.

BRIEF DESCRIPTION OF THE DRAWINGS

The accompanying drawing figures incorporated in and forming a part of this specification illustrate several aspects of the disclosure, and together with the description, serve to explain the principles of the disclosure.

DETAILED DESCRIPTION

Figure 1:
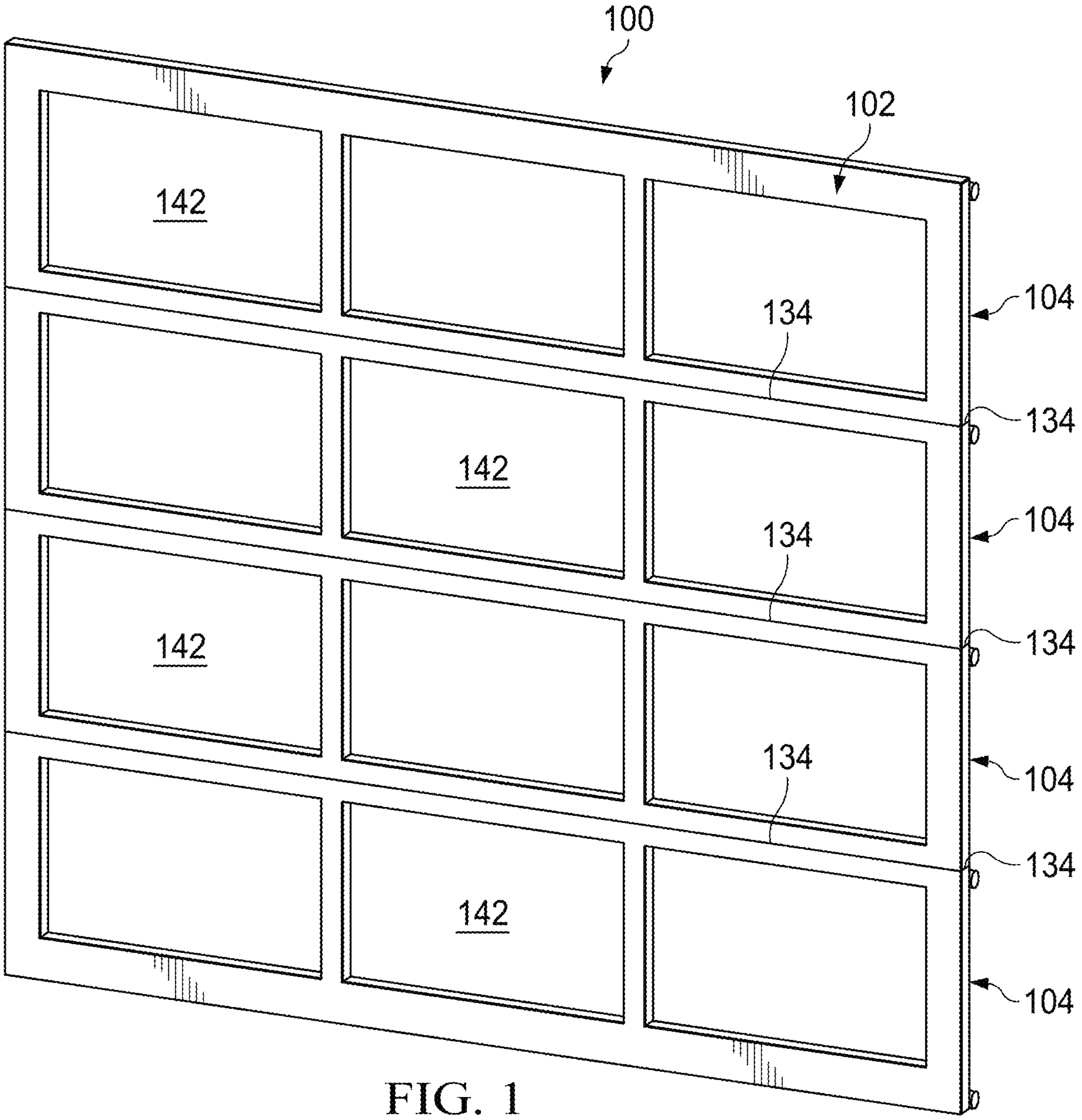
FIG. 1 is a perspective front view of a movable barrier, according to some aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Disclosed herein are flexible seals that are compressible to seal a section joint of a movable barrier by determining and/or implementing an optimized proportion of seal-flex distance. Thus, the present disclosure allows for a flexible seal which may distribute flexing stresses throughout the seal structure to prolong the seal's strength and/or stability, thereby producing an effective, durable, and long-lasting seal.

Seals for movable barriers, such as garage doors, may often be used in conditions in which the seal's compression is beyond the mechanical properties of the seal's material causing the seal to yield and take a permanent compression set. Compressing a seal for an extended time period in tight confines may eventually render the seal unable to effectively seal a movable barrier. Seal wear may be exacerbated if the seal is exposed to certain environmental conditions, such as heat, cold, sunlight, rain, humidity, dryness, and/or any other type of external condition. Thus, seals may often fail to provide a long life of continuous pressure to seal surfaces in sound, water, air & thermal (SWAT) conditions. Some seals may be susceptible to over-bending or crushing in one member or localized area of the profile. Wear on the seal may prevent section joints from sitting flush and/or prevent the movable barrier from closing properly.

The flexible seals disclosed herein for a section joint of a movable barrier may generally have two parts: a scalable end which may flex and a retaining end which may be relatively less flexible and may be fixed in place. Thus, a flexible seal may typically have a first proportion that flexes, for example, about 50% structural flexing and a second portion that is more fixed, such as about 50% fixed structure while in compression. The sealable end may be bulbous and may flex against the scalable surface. The retaining end may secure the seal to its host. However, in this configuration, only a portion, such as, for example, half of the flexible seal is available for flexing. In conventional systems, a seal with less flexing capability may be less resistant to crushing and taking a permanent compression set. However, increasing the seal-flex proportion may cause other problems, such as decreasing structural stability and reducing retaining strength. That is, increasing seal-flex proportion may allow the seal to bend and collapse during compression, weakening the seal strength. Further, a seal with reduced retaining strength may pull out of the slot causing the section joint to lose sealing capability.

This disclosed system, device, and/or method may increase seal-flex percentage while maintaining the structural strength of the seal and maintaining the seal's ability to be retained in a slot. At least a portion of a cavity in the flexible seal may lie below a neck of the seal providing additional flexibility. Legs (shown by viewing a cross-sectional profile of the flexible seal in some implementations) may be positioned in the center of the seal to elastically bend by collapsing inwardly to help absorb compression force. A solid rubber mass may be included at the base of the seal to increase retaining strength. More of the seal profile material may be configured to distribute the flexing stresses throughout more of the seal structure. The flexible seal may be configured to provide a continuous pressure to seal two surfaces. Thus, the flexible seal may effectively seal a section joint of a movable barrier.

FIG. 1 is a perspective front view of a movable barrier 100, according to some aspects of the present disclosure. A movable barrier may be used for any purpose such as for a residential garage door, warehouses, fire houses, and/or loading docks, for example. A movable barrier 100 may be part of a movable barrier system and may include at least one panel 102, which may be positioned vertically to form a sectional movable barrier 100. In some implementations, a panel 102 may also be referred to as a segment and/or a section. In some implementations a panel may be a single unitary piece, while in others, a panel may include multiple pieces such as at least one frame 104 and at least one insert 142. A frame 104 may form the rails and stiles of the panel 102 and the frame may hold the at least one insert 142 in position. A frame 104 may be positioned above and/or below another frame 104 such that a section joint 134 forms between the two frames 104. In some implementations, the section joint 134 may form at a gap between two frames. An insert 142 may be a window, panel, and/or any other type of structure that fills an opening in the frame.

Figure 2:
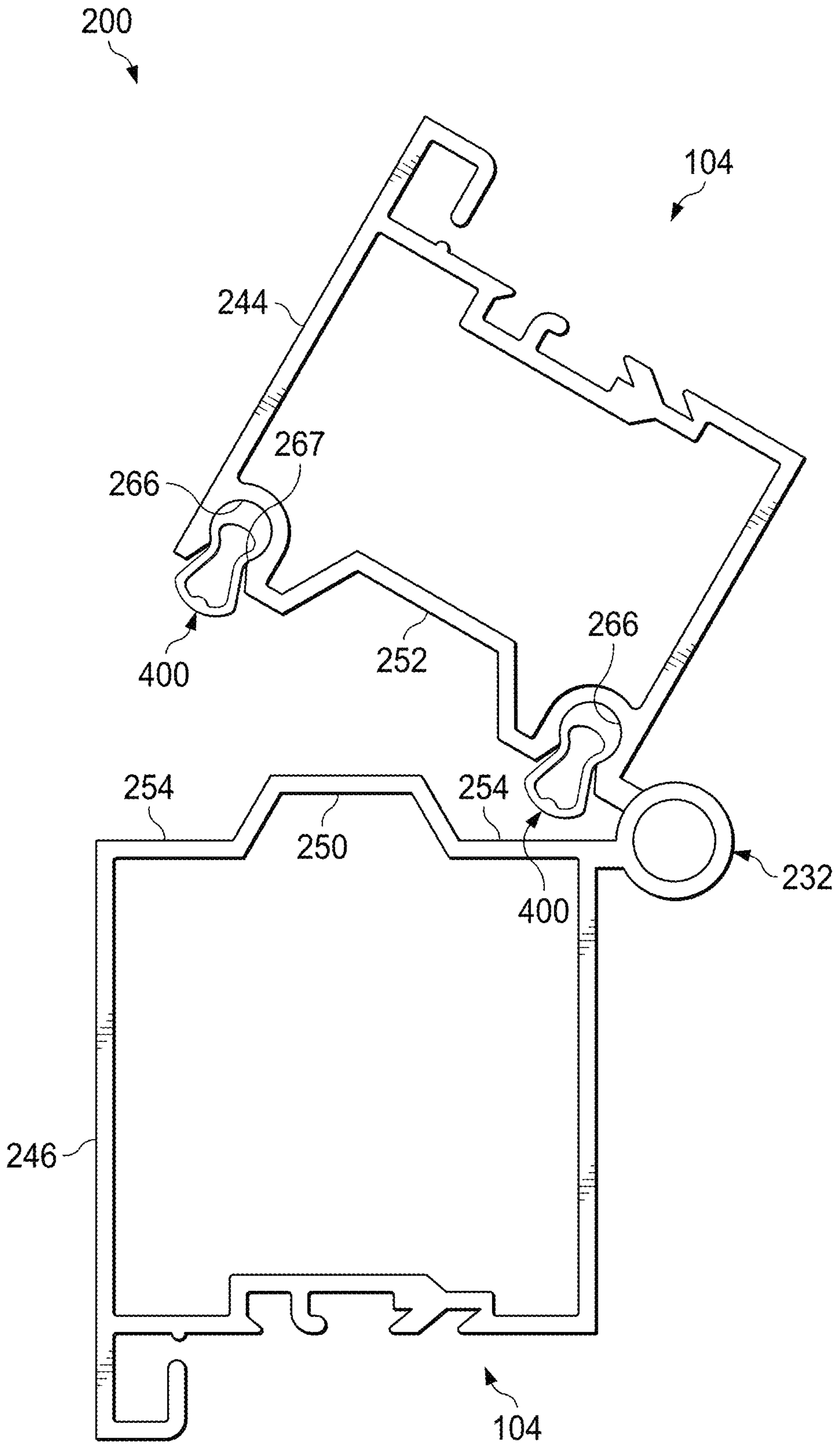
FIG. 2 is a side view of panel frames in an open position, according to some aspects of the present disclosure.

FIG. 2 is a side view showing an upper portion of one of the panel frames 104 and a lower portion of another of the panel frames 104. These are shown pivoted to an open position, according to some aspects of the present disclosure. In the example shown in FIG. 2, frames 104 may include a lower or first rail 244 and an upper or second rail 246 of two frames 104 in an open position. The upper or second rail 246 of the lower frame sits below the lower or first rail 244 of the second rail of the upper frame. In this example, the first rail 244 may include at least one slot 266 and at least one groove 252. The first rail 244 may couple to the second rail 246 with hinge 232. The second rail 246 may include at least one tongue 250 and a compressing surface 254. The second rail 246 may couple to the first rail 244 with hinge 232. In the example shown in FIG. 2, the hinge 232 is a barrel hinge but it should be understood that the hinge 232 may be any type of hinge such as a geared hinge, butt hinge, spring-loaded hinge, concealed hinge, overlay hinge, strap hinge, ball-bearing hinge, offset hinge, scissor hinge, continuous hinge, and/or double-action spring hinge. The hinge 232 may be configured to allow one rail to pivot relative to the other rail (depending on the implementation) such that the two frames 104 may have at least one open position and at least one closed position. The hinge 232 may allow the frames to be adjusted between an open position (or pivotably separated position) and a closed position. As discussed further herein, a slot 266 may contain at least a portion of a flexible seal 400. In the example shown in FIG. 2, the first rail 244 contains two slots 266. In some examples, each slot includes a narrow neck 267 with flared surfaces that widen the slot as the distance from the neck 237 increases. The groove 252 may couple with the tongue 250 to act as a barrier against water and/or other environmental conditions. In the examples shown in FIGS. 1-2, the first rail 244 may be positioned above the second rail 246. However, it should be understood that in some implementations, the second rail 246 may be positioned above the first rail 244.

Figure 3:
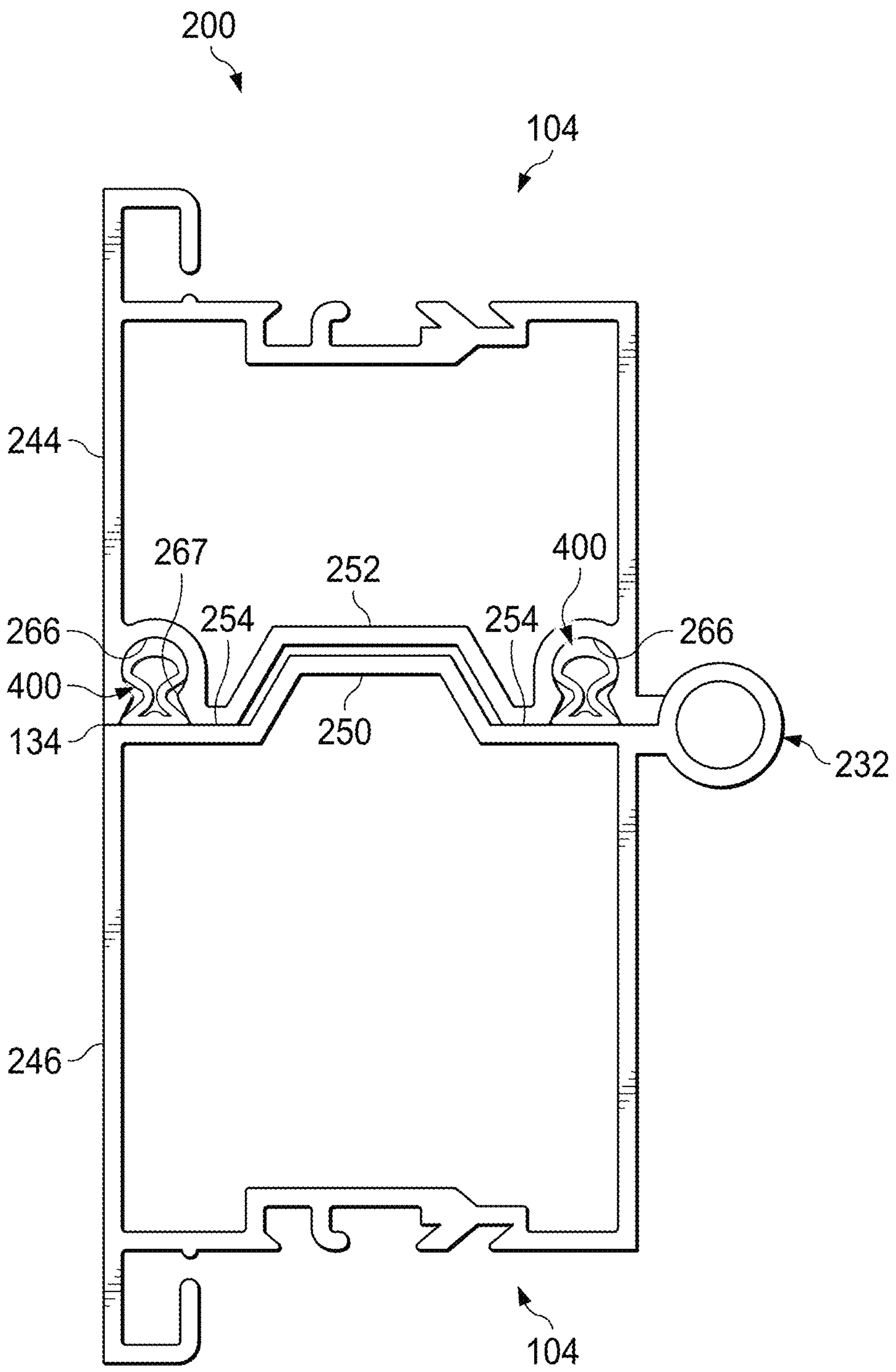
FIG. 3 is a side view of panel frames in a closed position, according to some aspects of the present disclosure.

In the example shown in FIG. 3, frames 104 are oriented so that the first rail 244 and the second rail 246 of the two frames 104 are in a closed position. When the frames 104 are in a closed position, at least one surface of the first rail 244 may be flush with or proximal to at least one surface of the second rail 246 to form section joint 134. In a closed position, the opening of slot 266 may be obstructed by at least one surface of the second rail 246 at section joint 134. As discussed further herein, the flexible seal 400 may be positioned between a slot 266 and the compressing surface 254 to seal the section joint 134. The groove 252 may couple with the tongue 250 to further seal the section joint 134 from water and/or other environmental conditions. In the example shown in FIG. 3, the hinge 232 may be in a closed position.

Figure 4:
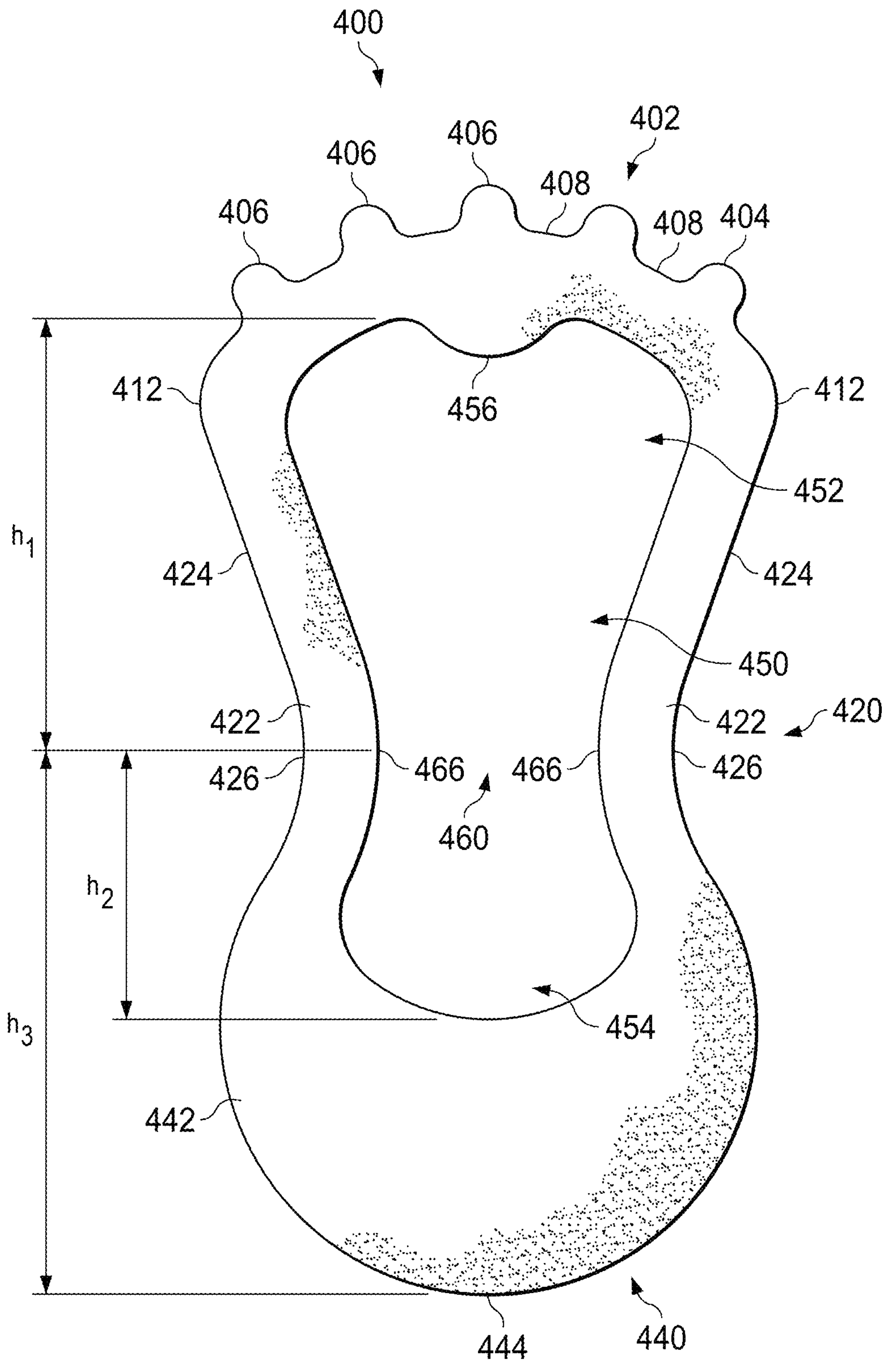
FIG. 4 is a side view of a flexible seal, according to some aspects of the present disclosure.

FIG. 4 is a side view of the flexible seal 400, according to some aspects of the present disclosure. The flexible seal 400 may include a first end 402, a second end 440, and a central region 420 between the first end 402 and the second end 440. Depending on the implementation, the flexible seal 400 may be made of any flexible and/or rubber-type material such as rubber, plastic, and/or foam. Depending on the implementation, any edge, corner, and/or boundary of the flexible seal 400 may include a fillet or chamfer for any purpose such as to increase bending flexibility and/or increase compression strength. Depending on the implementation, the flexible seal 400 and/or accompanying features on surrounding frames may or may not be symmetrical about a lengthwise axis of the flexible seal 400. Thus, in some implementations, the flexible seal 400 may include two of some features such as groove profiles 412, legs 422, oblique surfaces 424, outwardly facing surfaces 426, inwardly facing surfaces 466, and support surfaces 664.

The first end 402 may include a scalable surface 404, at least one optional tread 406, at least one tread groove 408, and/or at least one protrusion 456. The scalable surface 404 may extend across at least a portion of the outer surface of the first end 402. The scalable surface 404 may include at least one tread 406 and at least one tread groove 408. A tread 406 may comprise a protrusion extending on the scalable surface 404. A tread groove 408 may comprise a groove between two treads on the scalable surface 404. In some implementations, the flexible seal 400 may have zero or one tread 406. In some implementations, the flexible seal 400 may have more than one tread 406. In some implementations, the flexible seal 400 may five treads 406. The protrusion may extend from at least a portion of the inner surface of the first end 402. In some implementations, the end associated with the first end 402 may be bulbous.

The central region 420 may include legs 422, groove profiles 412, oblique surfaces 424, outwardly facing surfaces 426, inwardly facing surfaces 466, cavity 450, and neck 460. The legs 422 may extend from the first end 402 to the second end 440 and may be fully or substantially opposite each other. The legs 422 may, depending on the implementation, be any size and/or shape, such as any complex contour. In some implementations, the flexible seal 400 may have two legs 422, a first leg and a second leg. The legs 422 may include outwardly facing surfaces 426 extending across the outer surface of the legs 422 and inwardly facing surfaces 466 extending across the inner surface of the legs 422. The legs 422 may each comprise a wall bounding a side of the cavity 450.

The oblique surfaces 424 may extend across at least a portion of the upper area of the outwardly facing surfaces 426. In some implementations, the oblique surfaces 424 may form a conical shape between the scalable surface 404 and the neck 460. The groove profiles 412 may be positioned at the upper ends of the legs 422 forming a curved profile between the legs 422 and the scalable surface 404. Depending on the implementation, the groove profiles may be any shape such as curved, radial, oblique, and/or a complex contour.

The cavity 450 may include a first cavity portion 452 adjacent to the first end 402 and a second cavity portion 454 adjacent to the second end 440. In some implementations, the first cavity portion 452 may have a greater volume and/or a greater cross-sectional area than the second cavity portion 454. In some implementations, the first cavity portion 452 may have a volume and/or cross-sectional area more than twice as large as the second cavity portion 454. Thus, in some implementations, $h_1$ may be greater than $h_2$ where $h_1$ is a distance between the first end 402 and the neck 460 and $h_2$ is a distance between the second end 440 and the neck 460. The cavity 450 may, depending on the implementation, be any size and/or shape, such as any complex contour. The neck 460 may be positioned between the first end 402 and the second end 440 at the boundary between the first cavity portion 452 and the second cavity portion 454. The neck 460 may be positioned at the line that is the shortest distance between the legs 422 and at the line that is the shortest distance between the inwardly facing surfaces 466. Thus, in some implementations, the flexible seal 400 may be broadest at the first end 402 and/or the second end 440 and may slowly narrow approaching the center of the flexible seal 400 until most narrow at the portion of the legs 422 at the neck 460. Further, in some implementations, the cavity 450 may be broadest adjacent to the first end 402 and/or the second end 440 and may slowly narrow approaching the center of the cavity 450 until most narrow at the neck 460. Thus, the neck 460 may be narrower than the first end 402 and the second end 440. In some implementations, the second cavity portion 454 may extend less than halfway between the retaining surface 444 and the neck 460. Thus, in some implementations, $h_2$ may be less than half of $h_3$ where $h_3$ is a distance between the retaining surface 444 and the neck 460. In some implementations, the cavity may extend about 75% of the length of the flexible seal 400. In some implementations, the cavity may extend 50% to 75% of the length of the flexible seal 400. The retaining surface 444 may extend across at least a portion of the outer surface of the second end 440.

The second end 440 may include a mass 442 and a retaining surface 444. The mass 442 may include the entire volume of the second end 440 and may be completely, substantially, or mostly sold material. The mass 442 may be adjacent to the legs 422. In some implementations, the mass 442 may be greater in thickness than the wall of each of the legs 422. In some implementations, the mass 442 may be at least 1.5 times as thick as the wall of each of the legs 422. In some implementations, the mass 442 may be at least twice as thick as the wall of each of the legs 422. In some implementations, the end associated with the second end 440 may be bulbous.

In some implementations, the flexible seal 400 may further include an outer surface which may extend across the entire outer surface area of the flexible seal 400.

Figure 5:
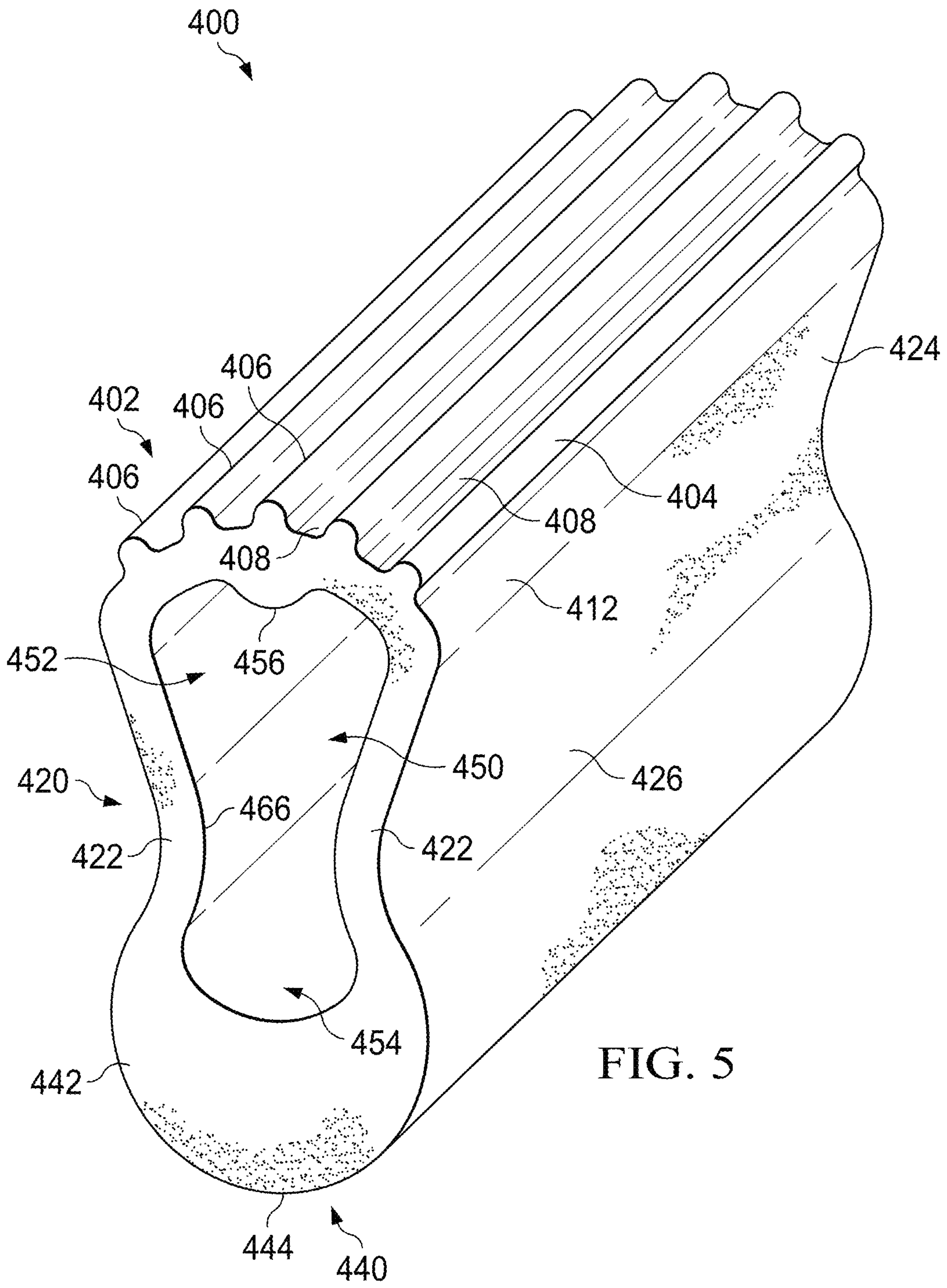
FIG. 5 is a perspective side view of a flexible seal, according to some aspects of the present disclosure.

FIG. 5 is a perspective side view of a flexible seal 400, according to some aspects of the present disclosure. As shown in the example in FIG. 5, in some implementations, the scalable surface 404, the treads 406, the tread grooves 408, the protrusion 456, the groove profiles 412, the legs 422, the oblique surfaces 424, the outwardly facing surfaces 426, the inwardly facing surfaces 466, the cavity 450, the first cavity portion 452, the second cavity portion 454, the neck 460, the mass 442, and/or the retaining surface 444 may extend along the entire or a substantial portion of the depth of the flexible seal 400. Depending on the implementation, the flexible seal may have any size of depth. In some implementations, the depth of the flexible seal may correspond to the length of a panel 102 and/or a frame 104. In some implementations, the depth of the flexible seal may correspond to a portion of the length of a panel 102 and/or a frame 104.

Figure 6:
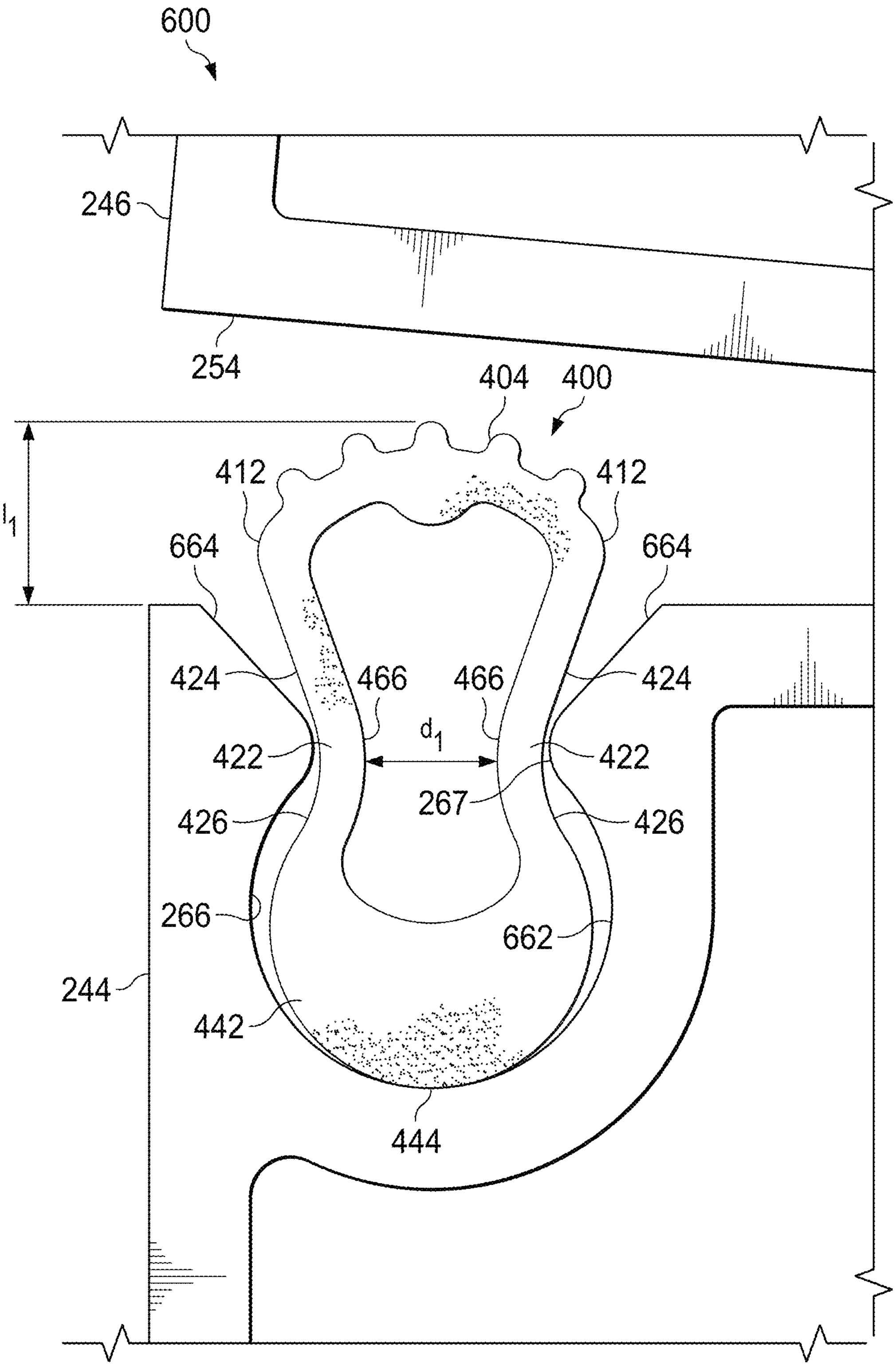
FIG. 6 is a side view of a flexible seal and panel frames in an open position, according to some aspects of the present disclosure.

FIG. 6 is a side view of a flexible seal 400 and panel frames 104 in an open position, according to some aspects of the present disclosure. In FIG. 6, the flexible seal 400 may be positioned between the first rail 244 and the second rail 246 in an open position. In the example shown in FIG. 6, the second rail 246 is positioned above the first rail 244. However, in some implementations, the first rail 244 and the second rail 246 may be switched such that the first rail 244 is positioned above the second rail 246 and the system may operate effectively. The flexible seal 400 may be positioned in the slot 266, with the neck 267 of the slot 266 aligned with the neck of the seal 400. Due to the weight of the flexible seal 400, the retaining surface 444 may rest on a slot surface 662 of the slot 266. The slot surface 662 may extend across the entire surface area of the slot 266. In some implementations, support surfaces 664 may form a portion of the slot surface 662. The support surfaces 664 may extend across an area of the slot surface 662 which is a boundary of the opening of the slot 266. In this example, the support surfaces 664 flare apart from the neck 267. Thus, in some implementations, the slot 266 may include an opening at least partially bounded by the support surfaces 664 and having a bottom circular portion. In some implementations, the support surfaces 664 may be flat and/or oblique, but it should be understood that the support surfaces 664 may be any size and/or shape depending on the implementation. In some implementations, no portion of the flexible seal 400 other than a portion of the retaining surface 444 may be touching the slot surface 662. In some implementations, other portions of the flexible seal 400 other than the retaining surface 444 may be touching the slot surface 662, such as the outwardly facing surfaces 426 and/or the oblique surfaces 424. In an open position, the compressing surface 254 of the second rail 246 may be positioned a distance away from the scalable surface 404. In some implementations, in the open position, the sealable surface may extend a distance $l_1$ from the edge of the first rail 244. It should be understood that depending on the implementation, the slot 266 may be any shape such that it may contain the flexible seal 400 such as shown in FIGS. 2-3 and 6-7, rectangular, and/or square. It should be understood that depending on the implementation, the slot 266 may be any size depth such that it may contain the partial or full length of the flexible seal 400. In some examples, the slot 266 may have a depth in a range of 0.1 to 1 inch, although depths larger and smaller are contemplated. In some implementations, the depth is about 5/16 inches, about 1/2 to 3/16 inches, about 3/8 to 1/4 inches, about 1/4 to 3/16 inches, and/or about 3/8 to 3/16 inches. In some implementations, the portion of the slot 266 below the neck 267 may have a diameter of any size, but in some implementations, about 1/4 to 3/8 inches. It should be understood that depending on the implementation, the distance between the neck 267 and the edge of the first rail 244 may be any distance such as about 1/8 to 1/4 inches. It should be understood that depending on the implementation, the neck 267 may be any size such as about 1/16 to 1/4 inches. It should be understood that in some implementations, the support surfaces 664 may be offset at an angle of any size from the axis of symmetry of the slot 266 such as about 60 to 80 degrees. In the example shown the neck 267 of the slot 166 is narrower than the second end 440 of the seal in a manner that prevents the seal 400 from falling from the slot 166. In some implementations, the sizes may be selected to allow the second end to be introduced through the neck 267 of the slot 266, with the second end of the slot elastically deforming to pass the neck and then elastically returning to its natural state which is larger than the neck 267 to hold the seal 400 in the slot 266. In some implementations, the distance between the legs 422 may be defined as $d_1$ as shown in FIG. 6.

Figure 7:
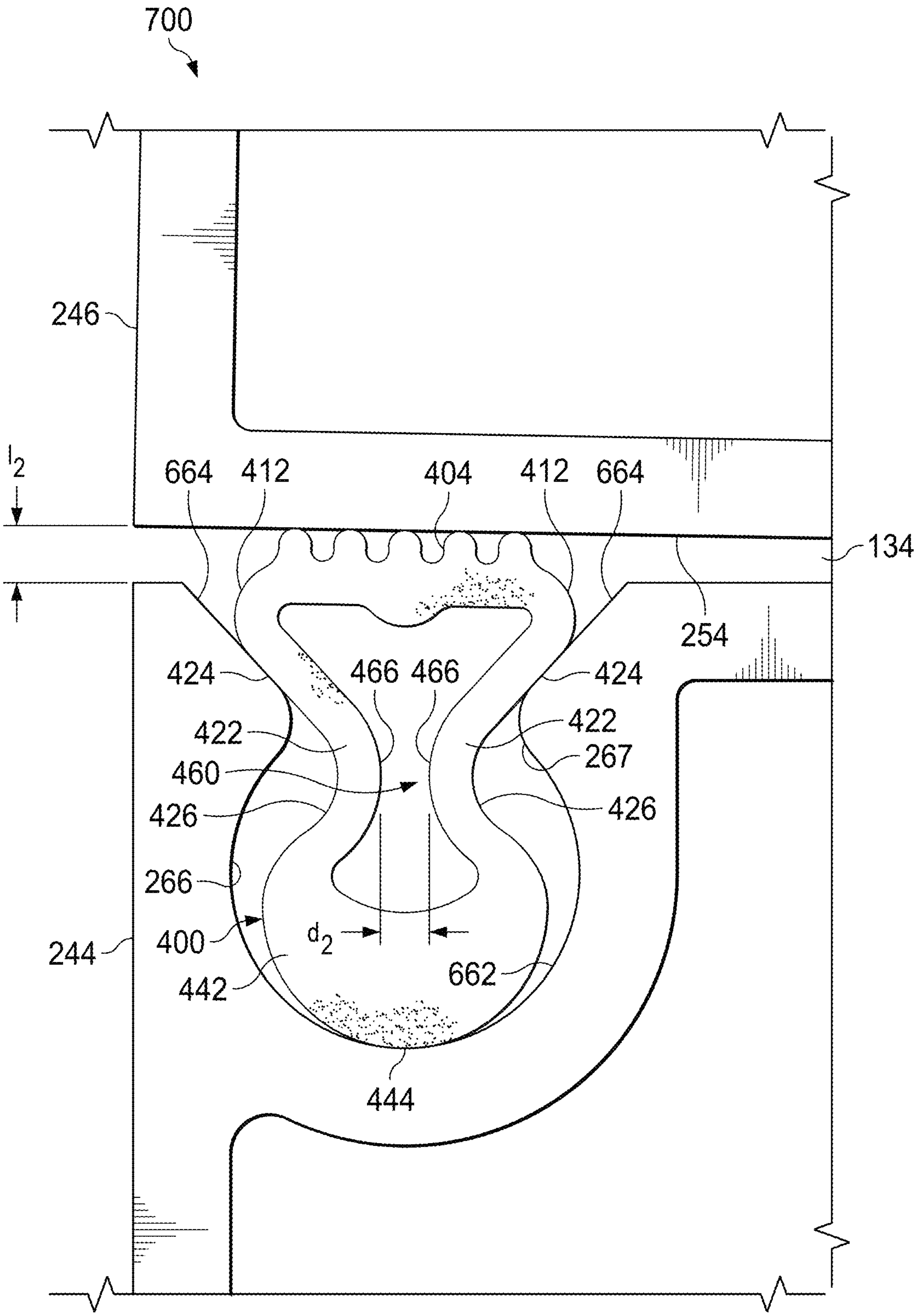
FIG. 7 is a side view of a flexible seal and panel frames in a closed position, according to some aspects of the present disclosure.

FIG. 7 is a side view of a flexible seal 400 and panel frames 104 in a closed position, according to some aspects of the present disclosure. In FIG. 7, the flexible seal 400 may be positioned between the first rail 244 and the second rail 246 in a closed position such that the flexible seal 400 may be compressed. In the example shown in FIG. 7, the second rail 246 is positioned above the first rail 244. The flexible seal 400 may be positioned in the slot 266. In some implementations, the compressing surface 254 of the second rail 246 may compress the flexible seal 400. Thus, the compressing surface 254 may act as a mating surface for the flexible seal 400. The compressing surface 254 may apply pressure to the treads 406 on the scalable surface 404 and the treads 406 on the scalable surface 404 may apply pressure to the compressing surface 254. The treads 406 may provide additional grip and flexibility to the scalable surface 404. Additionally, the treads may distribute the compression force across the scalable surface 404 and/or may provide grip to prevent the seal from bending. Before the flexible seal is compressed the sealable surface may have a convex shape while after the seal is compressed the scalable surface may have a substantially flat or concave surface depending on the implementation. In some implementations, in the closed position, the scalable surface may extend a distance $l_2$ from the edge of the first rail 244. In some implementations, the groove profiles 412 will not make contact with the compressing surface 254 and/or the slot surface 662. Thus, the groove profiles 412 may provide additional space for the material of the flexible seal 400 to flex into during compression. Further, the generous round fillet features of the groove profile 412 may allow for smooth bending radii between the scalable surface 404 and the outwardly facing surfaces 426. The protrusion 456 may be configured to provide support to the first end 402. The solid mass of flexible material in the protrusion 456 may provide structural support and/or rigidity to the first end 402 so that, for example, the first end 402 does not collapse into the cavity during compression. In some implementations, the oblique surfaces 424 may press against and/or become flush with the support surfaces 664. The oblique surfaces may be configured to provide additional structural support to the flexible seal 400. In some implementations, the first end 402 may be wider than the narrowest part of the slot 266 such that the oblique surfaces 424 exert a force on the support surfaces 664. Thus, the oblique surfaces 424 may structurally support the flexible seal 400 by preventing the flexible seal 400 from collapsing deeper into the slot 266. In some implementations, at least a portion of the support surfaces 664 may be fully or substantially flat to more effectively support the oblique surfaces 424. In some implementations, the pressure between the oblique surfaces 424 and the support surfaces 664 may be sufficient to prevent water from seeping into the lower part of the slot 266.

The legs 422 may be configured to flex and provide an opposing elastic force to the compression force of the compressing surface 254. Thus, in some implementations, the legs 422 may be referred to as spring legs since the legs function as a mechanism for storing potential energy. In the open and uncompressed position, the legs 422 may have an initial vertical length (i.e., along a lengthwise axis extending from the first end 402 to the second end 440). When the flexible seal 400 is compressed, the vertical length of the legs 422 may decrease from the initial length. Thus, the legs 422 may bend and collapse while providing a force towards the compressing surface 254. When the flexible seal 400 is compressed, the neck 460 may decrease in size such that the size of the opening between the first cavity portion 452 and the second cavity portion 454 decreases. Further, the length of the shortest distance between the legs 422 may decrease such that the legs 422 may bow inwardly. In some implementations, the distance between the legs 422 may be defined as $d_2$ as shown in FIG. 7. In some implementations, the length of the shortest distance between the legs 422 after compression will be about half the initial length of the shortest distance between the legs 422. In some implementations, the length of the shortest distance between the legs 422 after compression will between about 0.5 and 0 times the initial length of the shortest distance between the legs 422. In some implementations, the length of the shortest distance between the legs 422 may become 0 during compression such that the legs 422 contact and provide additional structural support to the flexible seal 400. Thus, before and after compression, the size and shape of the legs 422 may be any size and/or shape and the size and shape of the legs 422 may change from the uncompressed state to the compressed state. In some implementations, when the flexible seal 400 is compressed, the legs 422 may collapse inwardly in directions extending along an axis fully or substantially transverse to the lengthwise axis of the flexible seal 400. The lengthwise axis of the flexible seal 400 may be an axis extending from the first end 402 to the second end 440.

The solid mass of the mass 442 may be configured to provide additional structural support to the flexible seal 400. The solid mass of flexible material in the mass 442 may provide a firm structural support to the otherwise hollow flexible seal 400. Accordingly, in some implementations, the cavity 450 and second cavity portion 452 may end a length away from the retaining surface 444 such that the mass 442 may provide solid support to the flexible seal during compression and/or prevent the flexible seal 400 from collapsing inwardly. The mass 442 may be made of any one or more materials such as a flexible material like rubber.

In some implementations, when the flexible seal 400 transitions from a compressed position back to an uncompressed position, the sealable surface 404 may attach to the compressing surface 254 such that the flexible seal 400 tends to pull away from the slot 266 coinciding with the relative motion of the first rail 244 away from the second rail 246 as the section joint 134 opens. Thus, in some implementations, the mass 442 may be larger than the narrowest part of the slot 266 such that the flexible seal 400 remains in the slot 266 when a force pulls the flexible seal 400 out of the slot 266.

Figure 8:
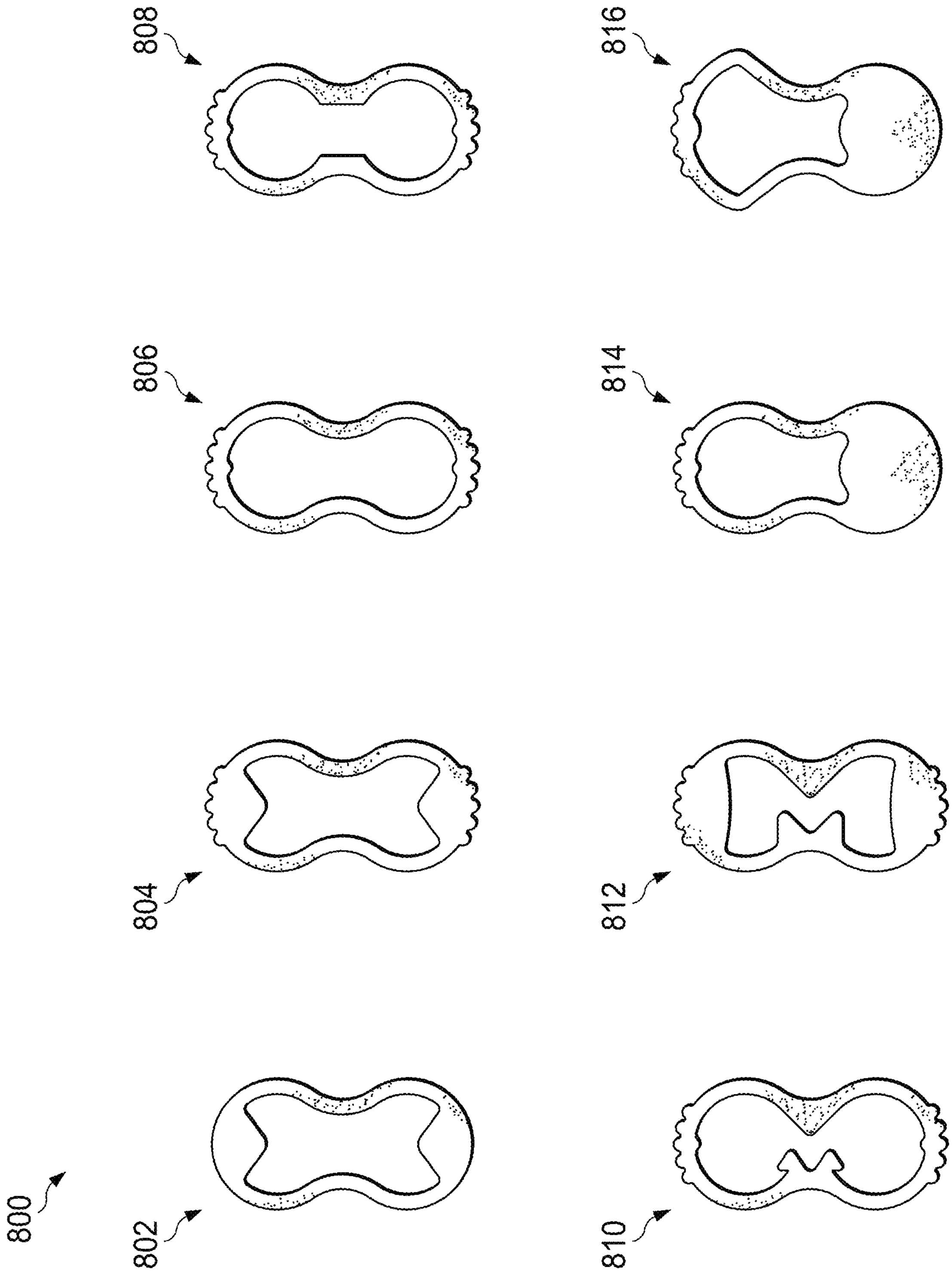
FIG. 8 illustrates examples of side views of flexible seals, according to some aspects of the present disclosure.

FIG. 8 illustrates examples of side views of additional flexible seals, according to some aspects of the present disclosure. That is, FIG. 8 illustrates eight examples of alternative implementations of the flexible seal 400 in FIGS. 4-5. It should be understood that the flexible seal 400 described with respect to FIGS. 4-5 is merely provided as an example of some implementations of the flexible seal and that the flexible seal may be any size and/or shape as described further herein. Flexible seal 802 may include a large cavity and inner supporting protrusions at each end. Flexible seal 804 may include a similar structure to flexible seal 802 with the addition of at least one tread at either or both outer ends. Flexible seal 806 may include similar structure to flexible seal 804 except that the inner supporting protrusions may be smaller. In some implementations, flexible seal 808 may include a similar structure to flexible seal 806 except that flat surfaces may be provided in the center of the cavity which may couple and provide support during compression and improve resistance to crushing. In some implementations, flexible seal 810 may include a similar structure to flexible seal 806 except a tongue and groove may be provided in the center of the cavity to interlock the legs and may couple and provide support during compression and improve resistance to crushing. In some implementations, flexible seal 812 may include similar structure to flexible seal 810 except that flexible seal 812 may have additional mass at either or both ends. In some implementations, flexible seal 814 may include a similar structure to flexible seal 806 except that flexible seal 814 may have additional mass at at least one end. In some implementations, flexible seal 816 may include similar structure to flexible seal 814 except that flexible seal 816 may have a larger surface at at least one end and may have fully or substantially flat surfaces extending across at least a portion of the sides to provide support.

It should be understood that although implementations in this disclosure may be referred to with words such as "upper," lower," "downwardly," and "upwardly," all implementations disclosed herein may be configured in any orientation and/or direction.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A flexible seal for sealing a gap between two adjacent frames of a movable barrier, the flexible seal comprising:

a first end comprising a sealable surface configured to selectively sealably press against one of the two adjacent frames;

a second end comprising a retaining surface configured to press against the other of the two adjacent frames; and a central region extending between the first end and the second end, the central region comprising a neck, a first leg, a second leg, and only one cavity, the neck being more narrow than the first end and the second end, the first leg and the second leg each comprising an inwardly facing surface and an outwardly facing surface, the first leg and the second leg being compressible into the cavity in a manner that a distance between the inwardly facing surfaces decreases when the two adjacent frames are brought together, wherein the outwardly facing surfaces each further comprise a contact surface, the contact surfaces forming an at least partially triangularly shaped cross-section between the sealable surface and the neck, and wherein the contact surfaces are further configured to press against a flat portion of a slot surface of the other of the two adjacent frames.

2. The flexible seal of claim 1, wherein the cavity further comprises a first cavity portion and a second cavity portion, the first cavity portion being positioned between the first end and the neck, the second cavity portion being positioned between the second end and the neck, the first cavity portion having a volume greater than the second cavity portion.

3. The flexible seal of claim 2, wherein the second cavity portion extends less than halfway from the neck to the retaining surface.

4. The flexible seal of claim 1, wherein the first leg and the second leg are further configured to collapse inwardly in directions extending along an axis substantially transverse to a lengthwise axis of the flexible seal.

5. The flexible seal of claim 1, wherein the second end comprises a mass, the mass being of a solid flexible material and having a maximum thickness at least twice as thick as a wall of either the first leg or the second leg.

6. The flexible seal of claim 1, wherein a portion of the retaining surface configured to press against the other of the two adjacent frames is curved.

7. The flexible seal of claim 1, wherein the flexible seal is configured in a manner that at least 75% of the longitudinal length of the flexible seal is positioned within a slot of the other of the two adjacent frames when the flexible seal is uncompressed.

8. A movable barrier system for sealing a gap between adjacent frames, the system comprising:

a first frame comprising a slot having an opening, the slot comprising a slot surface extending from the slot opening;

a second frame comprising a compressing surface;

a flexible seal comprising:

an outer surface including a sealable surface configured to selectively press against the compressing surface of the second frame, and a retaining surface configured to be retained within the slot of the first frame and extend out of the slot when in an uncompressed condition;

a first leg and a second leg each extending between the sealable surface and the retaining surface, the first leg being substantially opposite the second leg and cooperatively defining a neck between the sealable surface and the retaining surface; and a cavity comprising a first portion on a first side of the neck and a second portion on an opposing second side of the neck, the first leg and the second leg being configured to collapse into the cavity in a manner that a distance between the first leg and the second leg decreases when the flexible seal is compressed between the first frame and the second frame, wherein the flexible seal is configured in a manner that when the flexible seal is uncompressed, at least a portion of the flexible seal on both sides of the neck is positioned within the slot, and wherein the flexible seal is configured in a manner that when the flexible seal is compressed between the first frame and the second frame, at least a portion of the outer surface an at least partially vertical portion of the slot surface.

9. The movable barrier system of claim 8, wherein the first portion of the cavity has a volume greater than the second portion of the cavity.

10. The movable barrier system of claim 8, wherein the second portion of the cavity extends less than halfway from the neck to the retaining surface.

11. The movable barrier system of claim 8, wherein the flexible seal comprises outwardly facing surfaces comprising oblique surfaces forming an at least partially triangularly shaped cross-section between the sealable surface and the neck.

12. The movable barrier system of claim 11, wherein the oblique surfaces are further configured to press against a flat portion of the slot surface.

13. The movable barrier system of claim 8, wherein the first leg and the second leg are further configured to collapse inwardly in directions extending along an axis substantially transverse to a lengthwise axis of the flexible seal.

14. The movable barrier system of claim 8, wherein the flexible seal further comprises a mass at one end, the mass being of a solid flexible material and having a maximum thickness at least twice as thick as either the first leg or the second leg.

15. A method for sealing a gap between adjacent frames of a movable barrier, the method comprising:

providing a flexible seal, a first frame, and a second frame, the flexible seal comprising:

a first end comprising a sealable surface;

a second end comprising a retaining surface; and a central region disposed between the first end and the second end, the central region comprising a neck defined by a first leg and a second leg, the neck being more narrow than the first end and the second end, the first leg and the second leg each comprising an inwardly facing surface and an outwardly facing surface, the central region also comprising a cavity positioned between the first end and the second end;

positioning the flexible seal in a slot of the first frame, the slot comprising a slot opening and a slot surface extending from the slot opening; and displacing the second frame in a manner that a compressing surface of the second frame compresses the flexible seal, so that the sealable surface presses against the compressing surface and so that at least a portion of the retaining surface and at least a portion of the outwardly facing surfaces of both the first leg and the second leg press against the slot surface and a distance between the inwardly facing surfaces decreases, wherein when the flexible seal is compressed between the first frame and the second frame, at least a portion of the outwardly facing surfaces between the compressing surface and the neck contacts an at least partially vertical portion of the slot surface.

16. The method of claim 15, wherein the cavity further comprises a first cavity portion and a second cavity portion, the first cavity portion being positioned between the first end and the neck, the second cavity portion being positioned between the second end and the neck, the first cavity portion having a volume greater than the second cavity portion.

17. The method of claim 16, wherein the second cavity portion extends less than halfway from the neck to the retaining surface.

18. The method of claim 15, wherein the flexible seal comprises outwardly facing surfaces formed as oblique surfaces, the oblique surfaces forming an at least partially triangularly shaped cross-section between the sealable surface and the neck.

19. The method of claim 18, wherein when the flexible seal is compressed, the oblique surfaces are further configured to press against a flat portion of the slot surface.

20. The method of claim 15, wherein when the flexible seal is compressed, the first leg and the second leg are further configured to collapse inwardly in directions extending along an axis substantially transverse to a lengthwise axis of the flexible seal.

* * * * *